US011763328B2

(12) United States Patent
Ghoshal et al.

(10) Patent No.: US 11,763,328 B2
(45) Date of Patent: Sep. 19, 2023

(54) ADAPTIVE SURVEY METHODOLOGY FOR OPTIMIZING LARGE ORGANIZATIONS

(71) Applicant: JPMorgan Chase Bank, N.A., New York, NY (US)

(72) Inventors: Sidharth Ghoshal, Jersey City, NJ (US); Carlos M. Tang, Princeton, NJ (US); Scott Reynolds, Ridgewood, NJ (US); Eugen Tarnow, Fair Lawn, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 177 days.

(21) Appl. No.: 17/028,680

(22) Filed: Sep. 22, 2020

(65) Prior Publication Data
US 2021/0090104 A1    Mar. 25, 2021

Related U.S. Application Data

(60) Provisional application No. 62/904,238, filed on Sep. 23, 2019.

(51) Int. Cl.
| *G06Q 30/0203* | (2023.01) |
| *G06Q 10/0631* | (2023.01) |
| *G06Q 10/10* | (2023.01) |
| *G06Q 10/105* | (2023.01) |

(52) U.S. Cl.
CPC ... *G06Q 30/0203* (2013.01); *G06Q 10/06313* (2013.01); *G06Q 10/063118* (2013.01); *G06Q 10/103* (2013.01); *G06Q 10/105* (2013.01)

(58) Field of Classification Search
CPC .................. G06Q 30/0203; G06Q 10/063118
See application file for complete search history.

(56) References Cited

U.S. PATENT DOCUMENTS

| 2003/0061141 | A1* | 3/2003 | D'Alessandro | G09B 7/02 705/36 R |
| 2006/0046233 | A1* | 3/2006 | Byham | G09B 7/02 434/236 |
| 2007/0168241 | A1* | 7/2007 | Robbins | G06Q 10/10 705/7.42 |
| 2011/0178857 | A1* | 7/2011 | DelVecchio | G06Q 30/02 705/14.19 |
| 2012/0047000 | A1* | 2/2012 | O'Shea | G06Q 10/063 705/7.42 |

(Continued)

FOREIGN PATENT DOCUMENTS

| CA | 2992628 A1 * | 2/2017 | ........ G06F 16/24578 |

OTHER PUBLICATIONS

Julian B. Allen et al., "Using a Pulse Survey Approach to Drive Organizational Change", 2020, Organization Development Review, vol. 52, No. 3, pp. 62-68 (Year: 2020).*

*Primary Examiner* — Amanda Gurski
(74) *Attorney, Agent, or Firm* — Greenblum & Bernstein, P.L.C

(57) ABSTRACT

A system and method for conducting an adaptive survey. The method includes transmitting a first survey to a primary respondent; receiving responses to the first survey from the primary respondent; transmitting a subsequent survey to secondary respondents, the subsequent survey including answers provided in the first survey; and receiving responses to the subsequent survey from the secondary respondents.

20 Claims, 11 Drawing Sheets

(56) References Cited

U.S. PATENT DOCUMENTS

| | | | |
|---|---|---|---|
| 2014/0122183 A1* | 5/2014 | Niu | G06Q 30/0203 |
| | | | 705/7.32 |
| 2016/0063408 A1* | 3/2016 | Rajaganesan | G06Q 10/0639 |
| | | | 705/7.38 |
| 2017/0004516 A1* | 1/2017 | Hudson | G06Q 30/0203 |
| 2020/0402082 A1* | 12/2020 | Votava | G06F 16/9536 |

* cited by examiner

Projects

Please enter all projects you have worked on during the last thirty days. If you worked on a team project, please list the parts you were responsible for.
Your responses will depend on your scope, here are some sample responses with varying scope.

[ Project B               ]
☐ Confidential

[ Project C               ]
☐ Confidential

⊕ Add project

Please order the projects based on the value added to the firm (click & drag the tiles).

☐ I confirm the order and confidentiality of the projects.

[Back] 1 2 3 4 5 6 [Next]

FIG. 5

Projects

Please enter all projects you have worked on during the last thirty days. If you worked on a team project, please list the parts you were responsible for.
Your responses will depend on your scope, here are some sample responses with varying scope:

Project B
☐ Confidential

Project C
☐ Confidential

⊕ Add project

Please order the projects based on the value added to the firm (click & drag the tiles).

☐ I confirm the order and confidentiality of the projects.

[Back] 1 2 3 4 5 6 [Next]

FIG. 6

Reports

Please take the time to list anyone in the department who you directly supervise on any of your projects.
To save you time we have some suggestions below. These are only suggestions. Please remove anyone you no longer directly supervise.
At the bottom of the page is an ADD report box, please use this to lookup and add additional people by SID who aren't listed here.
Please NOTE: If you select a direct report, that person will not be available to select by another manager in this survey, we understand that in some situations that people might have multiple managers (ex: a separate local-people manager and functional-work-manager).
Please only add a person to this list if you are their primary work supervisor i.e. delegating work to them.

| TeamMember1 | ⊗ |
| TeamMember2 | ⊗ |

◉ [Add]
Valid SID Value

[Back] 1 2 <u>3</u> 4 5 6 [Next]

FIG. 7

Project Assignments

Assign the reports to the projects if applicable. Projects can be left without reports

| Project Name | Reports | |
|---|---|---|
| Project B | ☒ TeamMember1 | ☒ TeamMember2 |
| Project C | ☐ TeamMember1 | ☒ TeamMember2 |

[Back] 1 2 3 4 5 6 [Next]

FIG. 8

Project Connections

Now match your projects to one of the projects from the list in the "Connection" column or select "independent".
For every independent Project, additional information will be required. To do so, please briefly describe the project, how it was started, who is involved and/or any other information you feel is important.

| Project | Project it is part of | Additional information (required for independent projects) |
|---|---|---|
| Project B | Independent ˅ | rrr |
| Project C | Please Select ˅ | sdf |

[Back] 1 2 3 4 5 6 [Next]

FIG. 9

Please review your responses before submitting.

| Project name | Additional Information | Project connection | Priority | Effort | Assignee |
|---|---|---|---|---|---|
| Project B | rrr | Independent | 1 | 90 | Team Member 1<br>Team Member 2 |
| Project C | sdf | Independent | 2 | 10 | Team Member 2 |

[Submit]

[Back] 1 2 3 4 5 6

FIG. 10

Project Connections

Now match your projects to one of the projects from the list in the "Connection" column or select "independent".
For every independent Project, additional information will be required. To do so, please briefly describe the project, how it was started, who is involved and/or any other information you feel is important.

| Project | Project it is part of | Additional information (required for independent projects) |
|---|---|---|
| Project C | Project A ∨ | Enter a Note |
| Project D | Independent ∨ | project c |

[Back] 1 2 3 4 5 6 [Next]

FIG. 11

ADAPTIVE SURVEY METHODOLOGY FOR OPTIMIZING LARGE ORGANIZATIONS

CROSS-REFERENCE TO RELATED APPLICATION

This application claims the benefit of U.S. Provisional Application 62/904,238 filed Sep. 23, 2019, the disclosure of which is expressly incorporated by reference herein in its entirety.

BACKGROUND

1. Field of the Disclosure

This technology generally relates to methods and systems for conducting surveys in large organizations.

2. Background Information

Large organizations can have hundreds or even thousands of employees. Moreover, departments in such organizations can have hundreds of employees in various departments. As these organizations utilize large hierarchical organization with complex feature team and cross country relationships there is no way in the known art to quickly determine the set of all work being completed by the people in the organization and the hierarchical breakdown of the work, i.e., connected to the people. Due to large the size of the organization, management cannot easily determine how best to allocate resources for the benefit of the organization.

In the known art, there are programs, such as JIRA or BeeLine, which surveys all employees about the projects in which they participate so management can track to projects. While these programs can report lists of projects and the employees working on the projects, this report is a grouping of tasks from the perspective of the bottom of a hierarchical organizational chart. Thus, these reports cannot provide middle management with sufficient information whether any of the report projects are related to other reported projects. Further, as these programs only allow management to track tasks, they cannot be used to control workload or resources for the projects.

SUMMARY

The present disclosure, through one or more of its various aspects, embodiments, and/or specific features or sub-components, provides, inter alia, various systems, servers, devices, methods, media, programs, and platforms for an adaptive survey process that provides a multi-phased or staggered survey that surveys employees along the hierarchical organizational chart.

This multi-phased or staggered survey is designed to use responses already acquired in a previous phase to prompt users in the current phase to connect their work to previously responded work, so their surveys contain context specific information that they can bind themselves to. The survey process preferably operates top down, but a bottom up procedure is also possible in embodiments without departing from the spirit and scope of the invention. In this way, the survey provides reports that give a higher level of granularity than the above-identified known trackers, while simultaneously allowing for automatic linking and connecting projects, and gives users the feeling of receiving a custom tailored survey just for them.

From these adaptive surveys, management can study the organization, suggest working relationships, re-align work and people to increase efficiency, job satisfaction, worker productivity, etc. Because the employees are able to list out their work and give some kind of estimate of how their time is split amongst this work, management, combining this information with budget and salary information, can estimate how much money, people, and hours (and hours weighted by seniority) are being given to different projects.

Embodiments are directed to a system and method for conducting an adaptive survey of individuals having a reporting relationship. This reporting relationship can be established in flexible structure that includes, but is not limited to, a hierarchical organization. The method includes transmitting a first survey to a primary respondent in the hierarchical organization; receiving responses to the first survey from the primary respondent, the responses identifying projects managed and secondary respondents, the secondary respondents being subordinates working on the managed projects; transmitting a second survey to the identified secondary respondents working on the managed projects; and receiving responses to the second survey from the identified secondary respondents working on the managed projects.

Embodiments of an adaptive survey of individuals having a reporting relationship in a hierarchical organization, includes a processor; and a memory including instructions that, when executed by the processor, cause the processor to perform operations including: transmitting a first survey to a primary respondent in the hierarchical organization having a reporting duty; receiving responses to the first survey from the primary respondent, the responses identifying projects managed and subordinates working on the managed projects; transmitting a subsequent survey to secondary respondents, the secondary respondents being one of all subordinates of the primary respondent or all subordinates listed in the first survey of the primary respondent; and receiving responses to the subsequent survey from the secondary respondents, comprising a set of projects each secondary respondent is working on, and for each project, whether it is linked to a project provided by the primary respondent or whether it is a new project.

According to embodiments, the memory can including further instructions that, when executed by the processor, cause the processor to perform: displaying results of the first and subsequent surveys. Further, based upon the displayed results, a reallocation of resources can be made.

In accordance with other embodiments, after submitting the subsequent survey, a second primary respondent is identified as a subordinate of the primary respondent having a reporting duty. When a second primary respondent is identified, the memory can include further instructions that, when executed by the processor, cause the processor to perform: transmitting another survey to subsequent secondary respondents of the second primary respondent, the subsequent secondary respondents being one of all second subordinates of the second primary respondent or all subordinates listed in the subsequent survey of the second primary respondent; and receiving responses to the another survey from the subsequent secondary respondents, comprising a set of projects each subsequent secondary respondent is working on, and for each project, whether it is linked to a project provided by the second primary respondent or whether it is a new project.

Embodiments are directed to a method for conducting an adaptive survey of individuals with reporting duties and subordinates in a hierarchical organization, that includes transmitting a first survey to a primary respondent with a reporting duty in the hierarchical organization; receiving responses to the first survey from the primary respondent, the responses identifying projects managed and subordinates working on the managed projects; transmitting a subsequent survey to secondary respondents working for the primary respondent, the secondary respondents being one of all subordinates of the primary respondent or all listed in the first survey of the primary respondent; and receiving responses to the subsequent survey from the secondary respondents, comprising a set of projects each secondary respondent is working on, and for each project, whether it is linked to a project provided by the primary respondent or whether it is a new project.

In accordance with yet other embodiments, a second primary respondent is a secondary respondent that is a subordinate of a primary respondent with a reporting duty, and the method can further include transmitting another survey to subsequent secondary respondents that are second subordinates of the second primary respondent, the subsequent secondary respondents being one of all subordinates of the second primary respondent or all listed subordinates in the subsequent survey of the second primary respondent; and receiving responses to the another survey from the subsequent secondary respondents, including a set of projects each second subordinate is working on, and for each project, whether it is linked to a project provided by the subsequent secondary respondent or whether it is a new project.

Embodiments are directed to an adaptive survey system, which includes a processor; and a memory including instructions that, when executed by the processor, cause the processor to perform operations including: transmitting a first survey to a primary respondent; receiving responses to the first survey from the primary respondent; transmitting a subsequent survey to secondary respondents, the subsequent survey including answers provided in the first survey; and receiving responses to the subsequent survey from the secondary respondents.

In accordance with other embodiments, the memory can include further instructions that, when executed by the processor, cause the processor to perform further operations that include displaying results of the first and subsequent surveys. Based upon the displayed results, a reallocation of resources is made.

According to embodiments, the primary respondent can be an individual having a managerial or supervisory duties and the secondary respondents can be individuals having reporting duties to the primary respondent.

According to other embodiments, the primary respondent and the secondary respondents can be part of a hierarchical organization. Moreover, the responses to the first survey may identify projects managed and individuals working on the managed projects, and the secondary respondents may be one of all individuals in the hierarchical origination directly reporting to the primary respondent or all individuals identified in the first survey of the primary respondent as working on the managed projects. The responses to the subsequent surveys can identify a set of projects each secondary respondent is working on, and for each project, whether it is linked to a project provided by the primary respondent or whether it is a new project.

In accordance with still other embodiments, the memory can include further instructions that, when executed by the processor, cause the processor to perform further operations that include, after receipt of the subsequent surveys, transmitting a further survey to subsequent secondary respondents, the further survey including answers from at least one of the subsequent surveys. Further, the primary respondent may be an individual having a managerial or supervisory duties, the secondary respondents may be individuals having reporting duties to the primary respondent, and the subsequent secondary respondents may be individuals having reporting duties to at least one secondary respondent. The responses to the first survey can identify projects managed and individuals working on the managed projects, the secondary respondents can be one of all individuals in the hierarchical origination directly reporting to the primary respondent or all individuals identified in the first survey of the primary respondent as working on the managed projects, and the subsequent secondary respondents can be one of all individuals in the hierarchical origination directly reporting to the at least one secondary respondent or all individuals identified in the subsequent survey of the secondary respondent as working on the managed projects. The responses to the another surveys can identify a set of projects each subsequent secondary respondent is working on, and for each project, whether it is at least one of: linked to a project provided by the primary respondent, linked to a project provided by at least the secondary respondent or a new project.

In other embodiments, the subsequent survey enables secondary respondents to insert, update or correct information provided in the first survey that is related to projects and resources.

Embodiments are directed to a method for conducting an adaptive survey. The method includes transmitting a first survey to a primary respondent; receiving responses to the first survey from the primary respondent; transmitting a subsequent survey to secondary respondents, the subsequent survey including answers provided in the first survey; and receiving responses to the subsequent survey from the secondary respondents.

According to embodiments, the primary respondent can be an individual having a managerial or supervisory duties and the secondary respondents are individuals having reporting duties to the primary respondent.

In accordance with other embodiments, the primary respondent and the secondary respondents may be part of a hierarchical organization. Further, the responses to the first survey can identify projects managed and individuals working on the managed projects, and the secondary respondents may be one of all individuals in the hierarchical origination directly reporting to the primary respondent or all individuals identified in the first survey of the primary respondent as working on the managed projects. The responses to the subsequent surveys can identify a set of projects each secondary respondent is working on, and for each project, whether it is linked to a project provided by the primary respondent or whether it is a new project.

In still other embodiments, after receipt of the subsequent surveys, the method can further include transmitting a further survey to subsequent secondary respondents, the further survey including answers from at least one of the subsequent surveys. Moreover, the primary respondent can be an individual having a managerial or supervisory duties, the secondary respondents may be individuals having reporting duties to the primary respondent, and the subsequent secondary respondents may be individuals having reporting duties to at least one secondary respondent. The responses to the first survey may identify projects managed and individuals working on the managed projects, the secondary respondents may be one of all individuals in the hierarchical origination directly reporting to the primary respondent or all individuals identified in the first survey of the primary respondent as working on the managed projects, and the subsequent secondary respondents may be one of all individuals in the hierarchical origination directly reporting to the at least one secondary respondent or all individuals identified in the subsequent survey of the secondary respondent as working on the managed projects. Further, the responses to the another surveys may identify a set of projects each subsequent secondary respondent is working on, and for each project, whether it is at least one of: linked to a project provided by the primary respondent, linked to a project provided by at least the secondary respondent or a new project.

In accordance with still yet other embodiments, the subsequent survey enables secondary respondents to insert, update or correct information provided in the first survey that is related to projects and resources.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 5-11 are screen shots of exemplary web pages of the adaptive survey.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
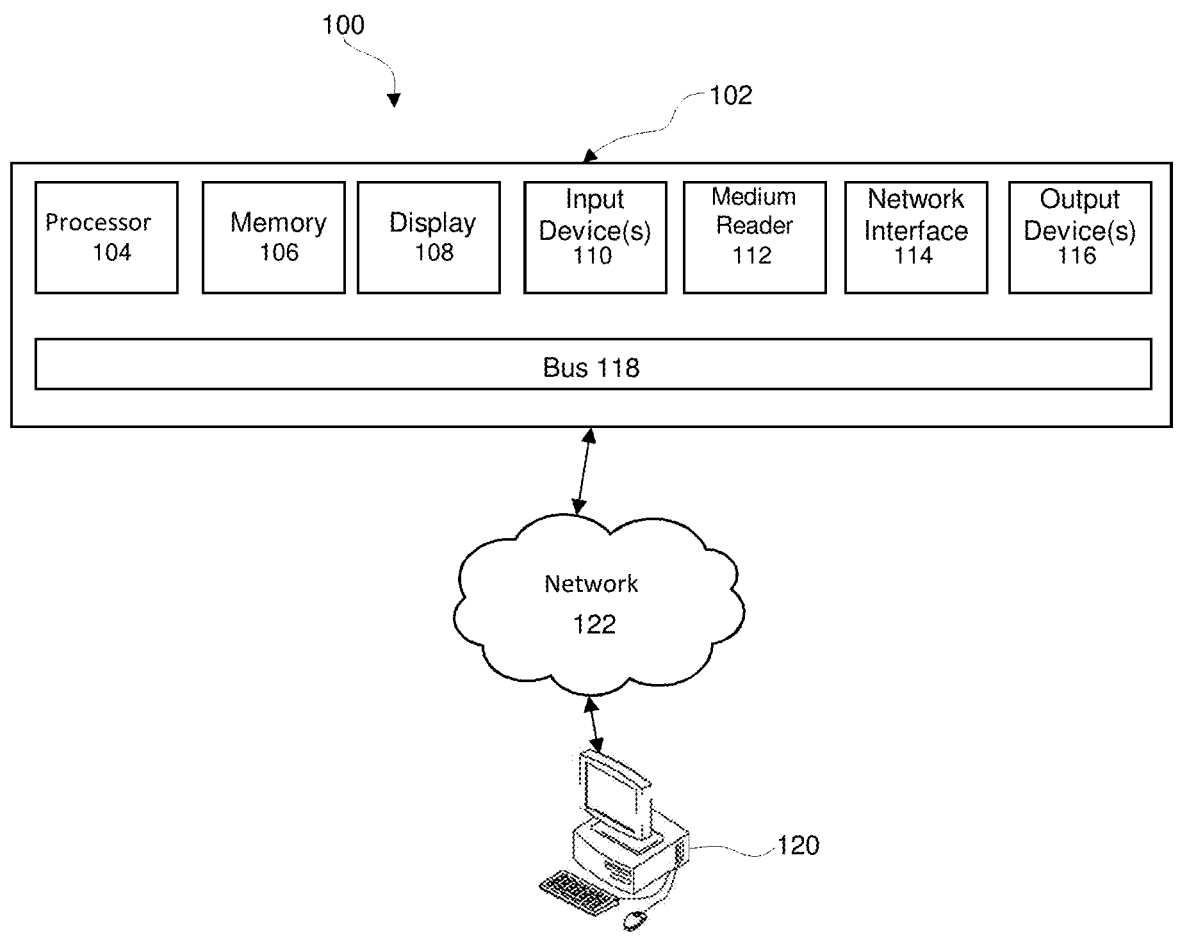
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for providing targeted notifications of information that has been determined as relevant with respect to potential recipients.

Figure 2:
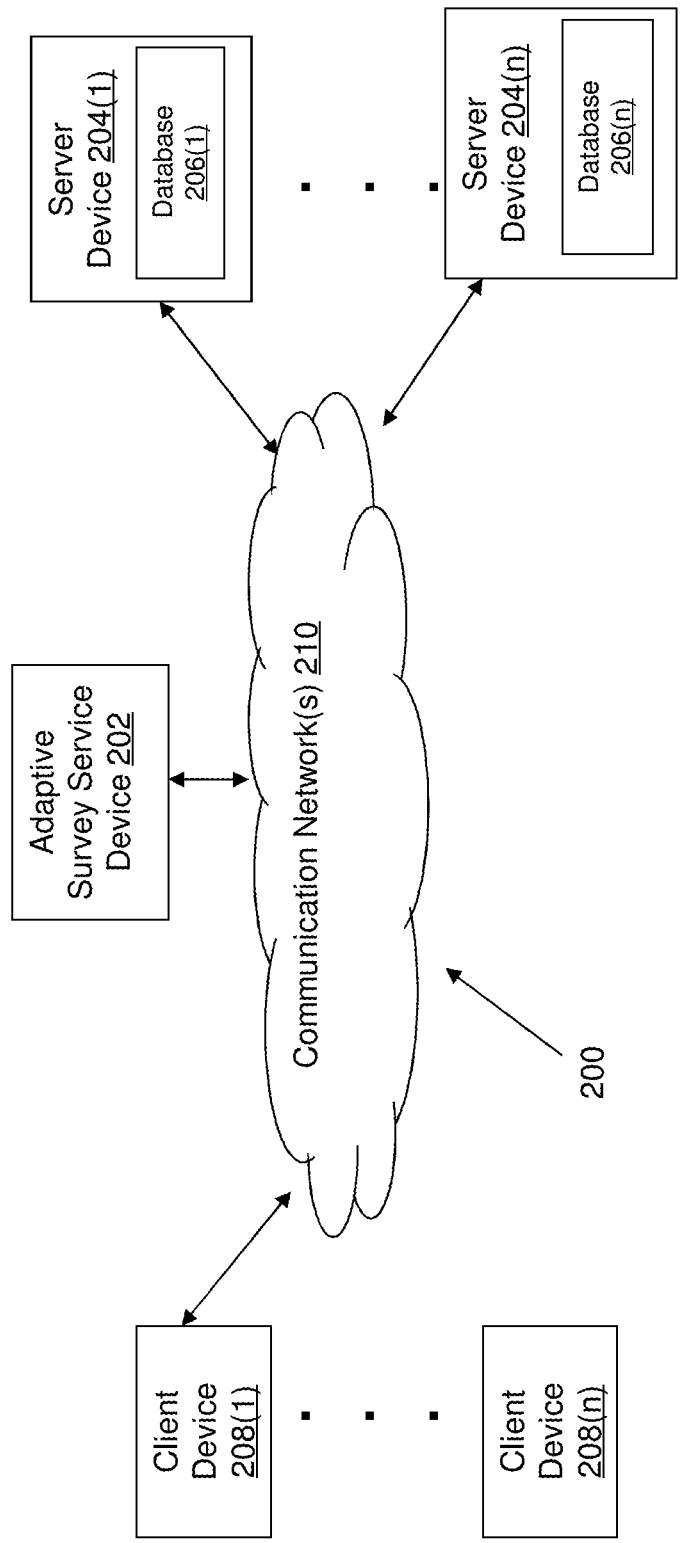
FIG. 2 illustrates an exemplary diagram of a network environment.

Referring to FIG. 2, a schematic of an exemplary network environment 200 for implementing a method for providing targeted notifications of information that has been determined as relevant with respect to potential recipients is illustrated. In an exemplary embodiment, the method is executable on any networked computer platform, such as, for example, a personal computer (PC).

The method for providing targeted notifications of information that has been determined as relevant with respect to potential recipients may be implemented by an Adaptive Survey Service device 202. The Adaptive Survey Service device 202 may be the same or similar to the computer system 102 as described with respect to FIG. 1. The Adaptive Survey Service device 202 may store one or more applications that can include executable instructions that, when executed by the Adaptive Survey Service device 202, cause the Adaptive Survey Service device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the Adaptive Survey Service device 202 itself, may be located in virtual server(s) running in a cloud-based computing environment rather than being tied to one or more specific physical network computing devices. Also, the application(s) may be running in one or more virtual machines (VMs) executing on the Adaptive Survey Service device 202. Additionally, in one or more embodiments of this technology, virtual machine(s) running on the Adaptive Survey Service device 202 may be managed or supervised by a hypervisor.

In the network environment 200 of FIG. 2, the Adaptive Survey Service device 202 is coupled to a plurality of server devices 204(1)-204(n) that hosts a plurality of databases 206(1)-206(n), and also to a plurality of client devices 208(1)-208(n) via communication network(s) 210. A communication interface of the Adaptive Survey Service device 202, such as the network interface 114 of the computer system 102 of FIG. 1, operatively couples and communicates between the Adaptive Survey Service device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the Adaptive Survey Service device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and Adaptive Survey Service devices that efficiently implement a method for providing targeted notifications of information that has been determined as relevant with respect to potential recipients.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The Adaptive Survey Service device 202 may be a standalone device or integrated with one or more other devices or apparatuses, such as one or more of the server devices 204(1)-204(n), for example. In one particular example, the Adaptive Survey Service device 202 may include or be hosted by one of the server devices 204(1)-204(n), and other arrangements are also possible. Moreover, one or more of the devices of the Adaptive Survey Service device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the Adaptive Survey Service device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to specific financial instruments, markets and market sectors, and client accounts and portfolios.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the Adaptive Survey Service device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the Adaptive Survey Service device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the Adaptive Survey Service device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the Adaptive Survey Service device 202, the server devices 204(1)-204(n), or the client devices 208(1)-208(n), for example, may be configured to operate as virtual instances on the same physical machine. In other words, one or more of the Adaptive Survey Service device 202, the server devices 204(1)-204(n), or the client devices 208(1)-208(n) may operate on the same physical device rather than as separate devices communicating through communication network(s) 210. Additionally, there may be more or fewer Adaptive Survey Service devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
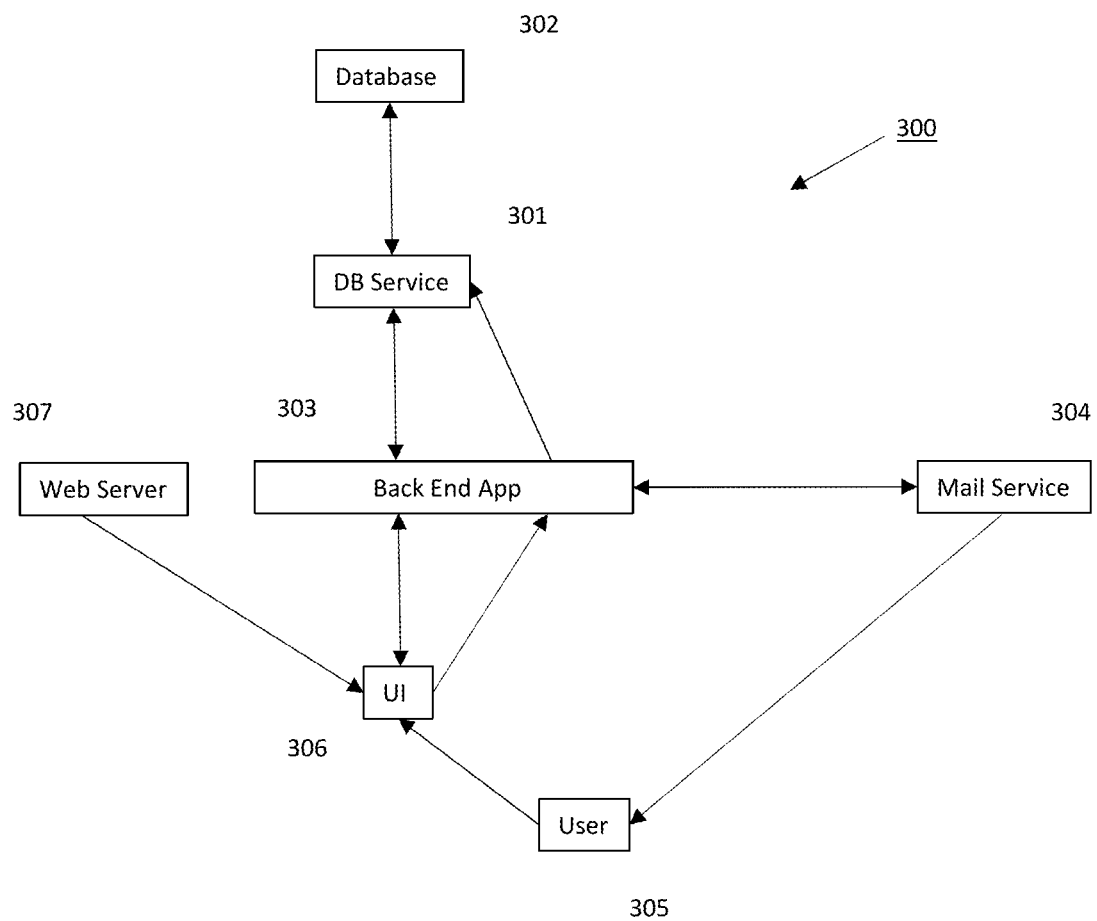
FIG. 3 illustrates an exemplary architecture for implementing an adaptive survey method.

An exemplary architecture 300, which more clearly shows the various modules, components, etc. for Adaptive Survey Service device 202, is described and shown in FIG. 3. Instructions for Adaptive Survey Service device 202 can be stored as a database service 301. Database service 301 can be coupled to database 302, which stores, e.g., survey data (past and present), user data/authentication information, etc., and to a back end application program interface (API) 303, which directs the process operation in accordance with instructions from database service 301. Back end API 303 can be coupled to a mail service 304, e.g., an email service, to communicate with users 305 at, e.g., set times/dates or at a manually initiated time when a survey is desired, and can be coupled to a user interface 306 to receive data/information provided by user 305, e.g., to confirm that the user is authorized to access/participate in the survey. Exemplary architecture 300 of Adaptive Survey Service device 202 can also include a web server 307, which is provided to download the survey to user 305, to receive the data input by user 305 and to transmit the survey data to back end API 303, which will record the user/survey data in database 302 via database service 301.

Rather than having all users answering the survey at one time, the adaptive survey in accordance with embodiments, conducts the survey in several phases along a hierarchical organization so that reporting relationships between individuals in within an organization can be identified and command and control throughout the organization can be analyzed. This can be achieved through the adaptive survey system in which the surveys are sent out sequentially, e.g., initially to primary respondents, who can be top individuals having reporting duties, e.g., top most managers or supervisors, and once complete, then to secondary respondents, who can be subordinates of the top most managers or supervisors, e.g., subordinates reporting to the top most manager or supervisor throughout the organizational layers. When the secondary respondents are also individuals with reporting duties, e.g., subsequent primary respondents having intermediate managing or supervisory duties, the process can be repeated so that a subsequent survey is sent to subsequent secondary respondents of the subsequent primary respondents. In this way, the survey can continue to cascade throughout the organization in a cyclic fashion, until all levels of the organization have been covered.

Further, embodiments are directed to a core idea that surveys are not sent out to all organization employees at a same time but instead can be sent sequentially so that information gathered from a previous survey respondent can be used to create the survey of a subsequent respondent. Therefore, in embodiments, in surveys sent to secondary respondents (or subsequent secondary respondents), the primary respondent's (or subsequent primary respondent's) answers can appear as choices for the second respondents (or subsequent second respondents) in answering their surveys.

In further embodiments, rather than identifying secondary respondents or subsequent secondary respondents from the primary respondent's (or from the subsequent primary respondent's) survey results, a phonebook or lookup table can be utilized to determine the next set of subsequent survey respondents.

By way of non-limiting example, primary respondents, e.g., managers or supervisors, may be asked what projects they are working on/supervising, which can be a listing of one or more different projects. Primary respondents may then be asked which of their direct reports, e.g., subordinates or employees, are working on the listed projects. Once the primary respondent completes the survey, a next phase of the survey is sent out to secondary respondents, who have been identified by the primary respondent and/or are identified using a phonebook or lookup table, so these secondary respondents can enter project names and select which projects are related to the projects that particular supervisors or managers are working on. The secondary respondents can also identify how much of their time is spent on each listed project. Through use of this adaptive survey, if a top manager has an important project, he would be able to see how many people in the organization are actually working this project, as well as how much time each secondary respondent spends on the project and what aspect on the project are they working on. Thus, the primary and/or subsequent primary respondents can make informed decisions for allocating resources.

Further, a given survey respondent may not be limited to identifying projects that were identified by a primary respondent's survey as a managed task on which the survey respondent is working. A secondary respondent can indicate that they are only working on some, or none, of the projects identified by the primary respondent. Moreover, the secondary respondent can identify additional projects or new projects, which may be independent projects, e.g., not under surveys received from the primary respondent of one of the listed managers. This is a key advantage in identifying work that the organization is engaged in, which their managers/ supervisors may not be aware of. Thus, this survey is advantageous because it is adaptive in the sense that one response comes before a next set of responses and the information of the first response can be used in the second set of responses.

Figure 4:
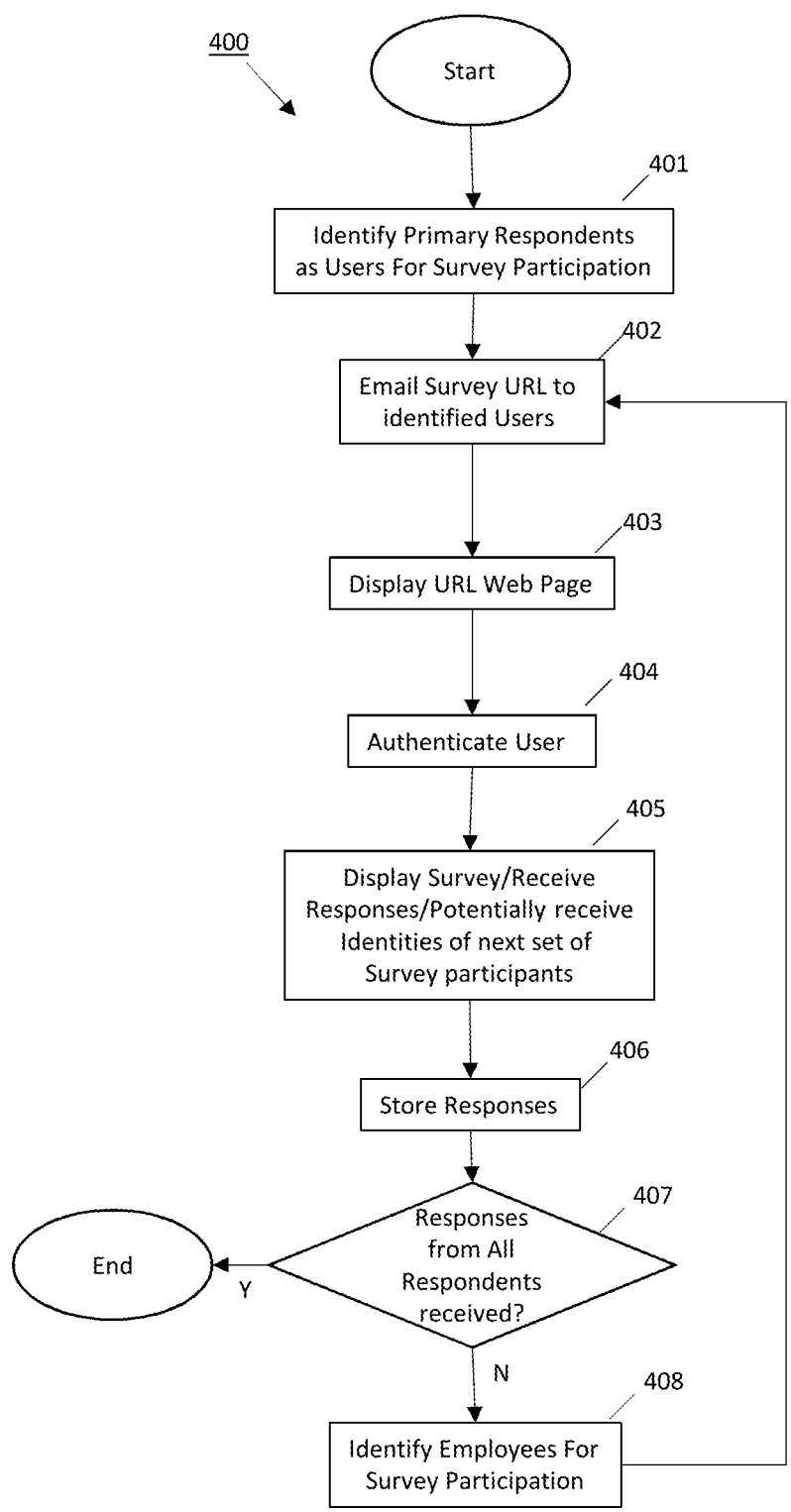
FIG. 4 is a flowchart of an exemplary process for implementing an adaptive survey method.

FIG. 4 illustrates a non-limited exemplary process 400 by which the adaptive survey system operates in accordance with embodiments. At 401, primary respondents, e.g., individuals having a reporting duty, such as manager, supervisors, etc., who are to participate in the survey are identified, e.g., by the database service and database. These identified primary respondents, at 402, are sent an email with a link or URL to a web page through which the survey is conducted. At 403, the survey web page can be displayed on the user's device and, at 404, the user's authority to access this web page is checked. When authorized, the survey is displayed to the user and the user's responses/answers to the survey are received at 405. At 406, the user's survey responses/answers are stored in the database. At 407, the process determines whether responses from all respondents have been stored. If yes, the process ends. If no, it may be that only the first phase of the survey is completed, so that secondary respondents, who have either been listed in the primary respondents' surveys or have been identified via a phonebook or lookup table, e.g., by the database service and database, are identified, at 408, to participate in the survey. In this event, the process returns to 402, where the web page URL email is sent to users identified as secondary respondents. The process then continues until it ends at 407, when it is confirmed that all the respondents' responses have been stored.

Moreover, at the second or subsequent occurrence at 405, if the user identifies subordinates in the survey response, i.e., the user may be an intermediate manager or supervisor, this user can be identified as a second primary respondent, such that subsequent secondary respondents may be identified in the survey to receive survey materials. Thus, it may take several iterations between 402 and 406 before responses from all respondents have been stored at 407. At that time, the process ends.

By way of non-limiting example, because the process is iterative, i.e., it repeats until surveys have been received from all respondents, the user can respond to the survey by identifying only the subordinates immediately reporting. Other subordinates will be identified and provided with surveys as the process continues.

As discussed above, a given survey respondent, i.e., second or subsequent second respondent, is not limited to identifying projects that their associated primary respondent indicated that he or she should be working on it. A second or subsequent second respondent can indicate that they are only working on some, or none, of the projects identified by their associated primary respondent. Moreover, the second or subsequent second respondent can identify additional projects, which is advantageous in identifying work that the organization is engaged in, which their associated primary respondents may not be aware of. In this way, the survey can continue to cascade throughout the organization in a cyclic fashion, until all levels of the organization have been covered.

FIGS. 5-11 show exemplary screenshots of the displayed web page for survey participants. In FIG. 5, an exemplary first screen of the survey web page, which is retrieved by a primary respondent is shown. From this page, the primary respondent can enter projects and engagement on which he/she are currently working, managing and/or supervising. Moreover, if the primary respondent worked as part of a team, the part or portion of the project that the primary respondent was responsible for can be listed here. The identified projects and engagements can presented in a prioritized order, and then submitted.

On a next exemplary web page, e.g., as shown in FIG. 6, the primary respondent can identify how much of his/her time, e.g., percent of time, is distributed between the listed project. Further, the survey software can monitor these responses to ensure that the total allotted time for all listed projects is 100%.

FIG. 7 shows an exemplary web page on which the primary respondent can list the individual(s) that he/she directly supervise or manage for each project identified on the exemplary web page of FIG. 5. Moreover, the primary respondent can also use this survey to update information, e.g., if any individuals are listed that the respondent no longer supervises or manages, the respondent can remove the name of these individuals. The survey software can also include a search function to allow the primary respondent look up and add additional individual or team members who are not listed.

A next exemplary web page is shown in FIG. 8, where the primary respondent can identify the individuals on each project that are tasked with a duty to report the project to the primary respondent.

FIG. 9 illustrates an exemplary web page on which, if applicable, the primary respondent can match or connect his/her projects to a larger project. Moreover, it is also possible for the primary respondent to indicate that a project is independent and, therefore, there is no direct report individual for the project. In the event a project is identified as independent, it is possible for the primary respondent to insert additional information with regard to this project, e.g., project description, how it was started, who is involved, etc.

Upon completion, an exemplary summary web page, as shown in FIG. 10, can be generated for the primary respondent to review his/her survey responses before submitting. If any changes are needed, the primary respondent can go back and make corrections/updates. Moreover, this page shows the beginning of a hierarchical relationship, from the primary respondent's perspective, between the primary respondent and the directly reporting individuals, i.e., second respondents, on the various listed projects.

FIG. 11 shows an exemplary web page of the subsequent survey, i.e., the survey transmitted to the secondary respondents (or to subsequent secondary respondents). The secondary respondents (or subsequent secondary respondents) to receive this subsequent survey can be identified by a phone book or lookup table or can be identified from the survey answers of the primary respondent (or a secondary respondent). In this survey, the secondary or subsequent secondary respondent will match the projects to one of the project types. These project types can be provided, e.g., in a drop down menu, and can include identifying the project type as "independent." An independent project can be understood as projects that does not connect to the primary respondent's projects. In this way, weaknesses in the chain of command can be exposed or make clear that that the organization is not organized in a hierarchical fashion. Moreover, when an independent project is identified, additional information can be provided to describe the independent projects, such as other individuals who are involved, what the project does, how did project start, and any other relevant information. In this exemplary web page, it is noted that the project types populated in the subsequent survey are those projects selected in the primary respondent's web page (see FIG. 5). This shows the adaptive nature of the survey questioning.

Moreover, it can be understood that, if the respondents are allowed to enter or even select the next level survey respondents, such as, by way of non-limiting example, their direct reports, at completion of the survey, some potential survey respondents may not have been selected. That is, they would have been "forgotten," further pointing to weaknesses in the organizational structure. Embodiments address this by distributing the subsequent surveys to second respondents, who may be other managers that can insert this forgotten information. Further, with regard missing or forgotten information, it is possible that a survey respondent may forget or be unaware of certain resources allotted to certain projects or may not adequately report a relationship between a particular project that is tied to a parent project. Embodiments address this by distributing the subsequent surveys to second respondents, who again may be other managers that more closely supervise these resources or projects, so that all relevant information with regard to projects and resources is received.

Further, in any social network that has an order of communication associated with it, the perceived order of communication can be checked by a similar survey that travels from one respondent to his/her perceived responders. The people left over at the end of the survey or the people claimed by more than one respondent show weaknesses or points of order conflict in the social network.

In other embodiments, the parent projects could be presented first in the survey to allow subsequent respondents to use that information to create their own projects for future work.

In addition to business type applications, it is understood that embodiments can also be directed to, by way of non-limiting example, a political campaign. For example, the survey could be used to tailor messages to local constituents. Thus, instead of "projects," per se, the survey could be utilized to solicit "successful election themes" and ask survey respondents to change the themes to better fit their survey respondents (eventually ending up with local constituents) and rank the new themes in order of perceived success.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An adaptive survey, comprising:
    a processor that supports a virtual processing environment; and
    a memory including at least one application that comprises instructions that, when executed by the processor, cause the processor to perform operations including:
    executing, in the virtual processing environment, a virtual server and a hypervisor that manages the virtual server;
    transmitting, by the virtual server, via a link to a first web page, a first survey to a primary respondent;
    enabling, by the virtual server, via the first web page, projects of the primary respondent, and a responsibility that the primary respondent has in each of the projects of the primary respondent, to be provided as answers to the first survey;
    when the primary respondent completes the first survey, generating, by the virtual server, a summary web page that prioritizes the projects of the primary respondent and shows a hierarchical relationship between the primary respondent and individuals that report to the primary respondent about the projects of the primary respondent;
    receiving, by the virtual server, responses to the first survey from the primary respondent;
    transmitting, by the virtual server, via a link to a second web page, a subsequent survey to secondary respondents, the subsequent survey including the answers provided in the first survey;
    enabling, by the virtual server, via the second web page, an amount of time that each of the secondary respondents spends on each of the projects of the primary respondent, and an involvement that each of the secondary respondents has in an aspect of each of the projects of the primary respondent, to be provided as responses to the subsequent survey; and
    receiving, by the virtual server, the responses to the subsequent survey from the secondary respondents,
    wherein the at least one application is the virtual server that is executing in the virtual processing environment, wherein the processor is implemented by parallel processing and component object distributed processing, and wherein the primary respondent is an individual having managerial or supervisory duties and the secondary respondents are the individuals that report to the primary respondent about the projects of the primary respondent.

2. The adaptive survey system in accordance with claim 1, the memory including further instructions that, when executed by the processor, cause the processor to perform further operations that include displaying results of the first and subsequent surveys.

3. The adaptive survey system in accordance with claim 2, wherein, based upon the displayed results, a reallocation of resources is made.

4. The adaptive survey system in accordance with claim 1, wherein the primary respondent and the secondary respondents are part of a hierarchical organization.

5. The adaptive survey system in accordance with claim 4, wherein the responses to the first survey identify projects managed and individuals working on the managed projects, and
    wherein the secondary respondents are one of all individuals in the hierarchical origination directly reporting to the primary respondent or all individuals identified in the first survey of the primary respondent as working on the managed projects.

6. The adaptive survey system in accordance with claim 5, wherein the responses to the subsequent survey identify a set of projects each secondary respondent is working on, and for each project, whether it is linked to a project provided by the primary respondent or whether it is a new project.

7. The adaptive survey system in accordance with claim 1, wherein the memory including further instructions that, when executed by the processor, cause the processor to perform further operations that include, after receipt of the subsequent survey, transmitting a further survey to subsequent secondary respondents, the further survey including answers from the subsequent survey.

8. The adaptive survey system in accordance with claim 7, wherein the subsequent secondary respondents are individuals having reporting duties to at least one secondary respondent.

9. The adaptive survey system in accordance with claim 8, wherein the responses to the first survey identify projects managed and individuals working on the managed projects,
    wherein the secondary respondents are one of all individuals in the hierarchical origination directly reporting to the primary respondent or all individuals identified in the first survey of the primary respondent as working on the managed projects, and
    wherein the subsequent secondary respondents are one of all individuals in the hierarchical origination directly reporting to the at least one secondary respondent or all individuals identified in the subsequent survey of the secondary respondent as working on the managed projects.

10. The adaptive survey system in accordance with claim 9, wherein the responses to the further survey identify a set of projects that each subsequent secondary respondent is working on, and for each project, whether it is at least one of: linked to a project provided by the primary respondent, linked to a project provided by at least the secondary respondent or a new project.

11. The adaptive survey according to claim 1, wherein the subsequent survey enables secondary respondents to insert, update or correct information provided in the first survey that is related to projects and resources.

12. A method for conducting an adaptive survey, wherein a processor that supports a virtual processing environment, implements the method by executing an application that includes instructions that, when executed by the processor, cause the processor to perform operations, the operations comprising:

executing, in the virtual processing environment, a virtual server and a hypervisor that manages the virtual server;
  transmitting, by the virtual server, via a link to a first web page, a first survey to a primary respondent;
  enabling, by the virtual server, via the first web page, projects of the primary respondent, and a responsibility that the primary respondent has in each of the projects of the primary respondent, to be provided as answers to the first survey;
  when the primary respondent completes the first survey, generating, by the virtual server, a summary web page that prioritizes the projects of the primary respondent and shows a hierarchical relationship between the primary respondent and individuals that report to the primary respondent about the projects of the primary respondent;
  receiving, by the virtual server, responses to the first survey from the primary respondent;
  transmitting, by the virtual server, via a link to a second web page, a subsequent survey to secondary respondents, the subsequent survey including the answers provided in the first survey;
  enabling, by the virtual server, via the second web page, an amount of time that each of the secondary respondents spends on each of the projects of the primary respondent, and an involvement that each of the secondary respondents has in an aspect of each of the projects of the primary respondent, to be provided as responses to the subsequent survey; and
  receiving, by the virtual server, the responses to the subsequent survey from the secondary respondents,
  wherein the at least one application is the virtual server that is executing in the virtual processing environment, wherein the processor is implemented by parallel processing and component object distributed processing, and wherein the primary respondent is an individual having managerial or supervisory duties and the secondary respondents are the individuals that report to the primary respondent about the projects of the primary respondent.

13. The method in accordance with claim 12, wherein the primary respondent and the secondary respondents are part of a hierarchical organization.

14. The method in accordance with claim 13, wherein the responses to the first survey identify projects managed and individuals working on the managed projects, and wherein the secondary respondents are one of all individuals in the hierarchical origination directly reporting to the primary respondent or all individuals identified in the first survey of the primary respondent as working on the managed projects.

15. The method in accordance with claim 14, wherein the responses to the subsequent survey identify a set of projects each secondary respondent is working on, and for each project, whether it is linked to a project provided by the primary respondent or whether it is a new project.

16. The method in accordance with claim 12, wherein, after receipt of the subsequent survey, the method further comprises transmitting a further survey to subsequent secondary respondents, the further survey including answers from at least one of the subsequent survey.

17. The method in accordance with claim 16, wherein the subsequent secondary respondents are individuals having reporting duties to at least one secondary respondent.

18. The method in accordance with claim 17, wherein the responses to the first survey identify projects managed and individuals working on the managed projects, wherein the secondary respondents are one of all individuals in the hierarchical origination directly reporting to the primary respondent or all individuals identified in the first survey of the primary respondent as working on the managed projects, and
  wherein the subsequent secondary respondents are one of all individuals in the hierarchical origination directly reporting to the at least one secondary respondent or all individuals identified in the subsequent survey of the secondary respondent as working on the managed projects.

19. The method in accordance with claim 18, wherein the responses to the further survey identify a set of projects that each subsequent secondary respondent is working on, and for each project, whether it is at least one of: linked to a project provided by the primary respondent, linked to a project provided by at least the secondary respondent or a new project.

20. The method according to claim 12, wherein the subsequent survey enables secondary respondents to insert, update or correct information provided in the first survey that is related to projects and resources.

* * * * *